(12) United States Patent
Lomax, Jr. et al.

(10) Patent No.: US 6,623,719 B2
(45) Date of Patent: *Sep. 23, 2003

(54) SYSTEM FOR HYDROGEN GENERATION THROUGH STEAM REFORMING OF HYDROCARBONS AND INTEGRATED CHEMICAL REACTOR FOR HYDROGEN PRODUCTION FROM HYDROCARBONS

(75) Inventors: Franklin Delano Lomax, Jr., Arlington, VA (US); John Reardon, Lakewood, CO (US); Jason P. Barbour, Fort Collins, CO (US)

(73) Assignee: H2GEN Innovations, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/116,163

(22) Filed: Apr. 5, 2002

(65) Prior Publication Data

US 2002/0146359 A1 Oct. 10, 2002

Related U.S. Application Data

(62) Division of application No. 09/642,008, filed on Aug. 21, 2000, now Pat. No. 6,497,856.

(51) Int. Cl.$^7$ .................................................. C01B 3/26
(52) U.S. Cl. ...................................................... 423/652
(58) Field of Search .......................... 252/373; 423/651, 423/652, 655, 656

(56) References Cited

U.S. PATENT DOCUMENTS 3,446,594 A  5/1969  Buswell et al.
3,477,832 A  11/1969 Mayland et al.

(List continued on next page.)

Primary Examiner—Wayne A. Langel
(74) Attorney, Agent, or Firm—Oblon, Spivak, McClelland, Maier & Neustadt, P.C.

(57) ABSTRACT

The present invention provides a reactor, which includes:

a unitary shell assembly having an inlet and an outlet;

a flow path extending within the shell assembly from the inlet to the outlet, the flow path having a steam reformer section with a first catalyst and a water gas shift reactor section with a second catalyst, the steam reformer section being located upstream of the water gas shift reactor section;

a heating section within the shell assembly and configured to heat the steam reformer section; and a cooling section within the shell assembly and configured to cool the water gas shift reactor section. The present invention also provides a simplified hydrogen production system, which includes the catalytic steam reforming and subsequent high temperature water gas shift of low-sulfur (<100 ppm by mass) hydrocarbon fuels followed by hydrogen purification through the pressure swing adsorption (PSA). The integrated reactor offers significant advantages such as lower heat loss, lower parts count, lower thermal mass, and greater safety than the many separate components employed in conventional and is especially well-suited to applications where less than 15,000 standard cubic feet per hour of hydrogen are required. The improved system also may be started, operated and shut down more simply and quickly than what is currently possible in conventional systems. The improved system preferably employs active temperature control for added safety of operation. The hydrogen product is of high purity, and the system may be optionally operated with a feedback control loop for added purity.

20 Claims, 9 Drawing Sheets

U.S. PATENT DOCUMENTS

| | | | |
|---|---|---|---|
| 3,485,746 A | 12/1969 | Setzer et al. | |
| 3,541,729 A | 11/1970 | Dantowitz | |
| 3,551,124 A | 12/1970 | Iwaki et al. | |
| 3,655,448 A | 4/1972 | Setzer | |
| 3,807,963 A | 4/1974 | Smith | |
| 3,909,299 A | 9/1975 | Corrigan | |
| 4,004,947 A | 1/1977 | Bloomfield | |
| 4,554,223 A | 11/1985 | Yokoyama et al. | |
| 4,781,241 A | 11/1988 | Misage et al. | |
| 4,904,455 A | 2/1990 | Karafian et al. | |
| 4,909,808 A | 3/1990 | Voecks | |
| 4,921,680 A | 5/1990 | Bonk et al. | |
| 4,976,747 A | 12/1990 | Szydlowski et al. | |
| 5,030,440 A * | 7/1991 | Lywood et al. | 423/652 |
| 5,110,559 A | 5/1992 | Kondo et al. | |
| 5,186,859 A | 2/1993 | Sie | |
| 5,207,185 A | 5/1993 | Greiner et al. | |
| 5,284,717 A | 2/1994 | Yamase et al. | |
| 5,360,679 A | 11/1994 | Buswell et al. | |
| 5,382,271 A | 1/1995 | Ng et al. | |
| 5,464,606 A | 11/1995 | Buswell et al. | |
| 5,470,360 A | 11/1995 | Sederquist | |
| 5,484,577 A | 1/1996 | Buswell et al. | |
| 5,486,313 A | 1/1996 | De Jong et al. | |
| 5,510,056 A | 4/1996 | Jacobs et al. | |
| 5,516,344 A | 5/1996 | Corrigan | |
| 5,614,163 A * | 3/1997 | Bhattacharyya et al. | 423/418.2 |
| 5,628,931 A | 5/1997 | Lednor et al. | |
| 5,639,401 A | 6/1997 | Jacobs et al. | |
| 5,658,497 A | 8/1997 | Kumar et al. | |
| 5,669,960 A | 9/1997 | Couche | |
| 5,720,901 A | 2/1998 | De Jong et al. | |
| 5,733,347 A | 3/1998 | Lesieur | |
| 5,980,857 A * | 11/1999 | Kapoor et al. | 423/648.1 |

* cited by examiner

SYSTEM FOR HYDROGEN GENERATION THROUGH STEAM REFORMING OF HYDROCARBONS AND INTEGRATED CHEMICAL REACTOR FOR HYDROGEN PRODUCTION FROM HYDROCARBONS

This application is a Division of application Ser. No. 09/642,008 Filed on Aug. 21 2000, U.S. Pat. No. 6,497,856.

BACKGROUND OF THE INVENTION

1. Field of the Invention

The present invention relates to an integrated chemical reactor for the production of hydrogen from hydrocarbon fuels such as natural gas, propane, liquefied petroleum gas, alcohols, naphtha and other hydrocarbon fuels and having a unique unitized, multifunctional structure. The integrated reactor offers significant advantages such as lower heat loss, lower parts count, lower thermal mass, and greater safety than the many separate components employed in conventional systems to achieve the same end. The integrated reactor is especially well-suited to applications where less than 15,000 standard cubic feet per hour of hydrogen are required.

The present invention also relates to the generation of hydrogen for use in industrial applications, as a chemical feedstock, or as a fuel for stationary or mobile power plants.

2. Discussion of the Background

Hydrogen production from natural gas, propane, liquefied petroleum gas (LPG), alcohols, naphtha and other hydrocarbon fuels is an important industrial activity. Typical industrial applications include feedstock for ammonia synthesis and other chemical processes, in the metals processing industry, for semiconductor manufacture and in other industrial applications, petroleum desulfurization, and hydrogen production for the merchant gas market. The demand for low-cost hydrogen at a smaller scale than produced by traditional industrial hydrogen generators has created a market for small-scale hydrogen production apparatus (<15,000 standard cubic feet per hour (scfh)). This demand has been augmented by the growing enthusiasm for hydrogen as a fuel for stationary and mobile powerplants, especially those employing electrochemical fuel cells, which require hydrogen as a fuel.

Hydrogen is typically produced from hydrocarbon fuels industrially via chemical reforming using combinations of steam reforming and partial oxidation. This is typically achieved at scales larger than one ton per day using well-known process and catalyst designs. For several reasons, it is difficult to adapt these large-scale technologies to economically produce hydrogen at small scales. Typical industrial applications produce far more than 15,000 standard cubic feet per hour (~1 ton per day), and often employ catalytic steam reforming of light hydrocarbons in radiantly-fired furnaces. Steam reforming of hydrocarbons is illustrated for the simple case of methane below.

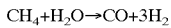

The above reaction is highly endothermic, and the reacting fluid must have energy transferred to it for the reaction to proceed. Further, the extent of the reaction is low at low temperatures, such that greatly elevated temperatures, often as high as 800° C., are required by conventional systems to convert an acceptable amount of hydrocarbon to hydrogen and carbon monoxide. The catalyst employed in industrial reactors is typically composed of an active nickel metal component supported on a ceramic support.

The radiantly-fired furnaces employed in large-scale industrial reactors have many disadvantages that make them unsuitable for small-scale systems. The most important disadvantage is the very high temperature of the radiant burners and the gas contacting the reactor surfaces, which are usually tubular in form. The temperature of the radiant burners often approaches or exceeds the melting temperature of the alloy from which the tubes are fabricated. Melting of the tubes is prevented by the rapid endothermic catalytic reaction inside the tubes. If, however, the catalyst fails due to carbon formation, sulfur poisoning or other causes, then the tubes form what is referred to in the literature as a "hot spot," which greatly accelerates the failure of the reactor tube in question. In large-scale systems, careful monitoring and control of the furnace and tube temperatures as well as exceptionally rugged construction of the tubes makes the risks of hot spots acceptable. For systems producing below 1 ton per day, however, the complexity and cost of such safety measures can become prohibitive. Nonetheless, small-scale steam reformers utilizing radiant heat transfer are known and described, for example, in U.S. Pat. No. 5,484,577 to Buswell. et al. The extreme measures necessary to control the temperature in arrays of reformer tubes are likewise documented in U.S. Pat. No. 5,470,360 to Sederquist.

A means of transferring the necessary heat to the reacting gases without radiant heat transfer and its attendant risks, which is especially well-suited to small-scale steam reforming, is the use of compact heat exchange surfaces, such as arrays of tubes or finned-plates. The heat transfer mechanism in such devices is dominated by convection and conduction with minimal radiant transfer. An example of this approach is described in U.S. Pat. No. 5,733,347 to Lesuir, wherein finned plates are employed to increase heat transfer. Tubular compact heat exchangers for steam reforming are sold by Haldor Topsoe, Inc. of Houston, Tex.

Conventional hydrogen generation systems employing steam reforming of hydrocarbon fuels typically include three main reaction steps for producing hydrogen; steam reforming, high-temperature water gas shift, and low temperature water gas shift. The important reactions for methane are as follows:

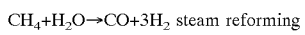

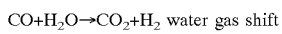

It is evident from the equation for steam reforming of hydrocarbon fuel that the principal products are hydrogen and carbon monoxide. The carbon monoxide may be converted into additional hydrogen via a catalytic reaction with steam (water gas shift reaction.

The water gas shift reaction is mildly exothermic and thus is thermodynamically favored at lower temperatures. However, the kinetics of the reaction are superior at higher temperatures. Thus, it is common practice to first cool the reformate product from the steam reformer in a heat exchanger to a temperature between 350° C. and 500° C. and conduct the reaction over a catalyst composed of finely divided oxides of iron and chromium formed into tablets. The resulting reformate gas is then cooled once again to a temperature between 200° C. and 250° C. and reacted over a catalyst based upon mixed oxides of copper and nickel. An example of this approach is given in U.S. Pat. No. 5,360,679 to Buswell. et al. In cases where an exceptionally pure hydrogen product is required, the temperature of the low-temperature shift converter is controlled by including a heat exchanger in the reactor itself, and an example of this approach is given in U.S. Pat. No. 5,464,606 to Buswell. et al. In all cases, the low temperature shift converter is quite large because of the poor catalyst activity at low temperatures.

In conventional systems, subsets of the process components are connected to one another via external plumbing; each component of the process being typically referred to as a "unit process," in the chemical engineering literature. This approach is preferred in large, industrial units because standard hardware may be used. Owing to the large size of industrial units, the unit process approach also makes shipping of the components to the site of the installation feasible, as combinations of the components are sometimes too large to be transported by road or rail.

For systems producing less than 1 ton per day, however, the unit process approach has many disadvantages. The first disadvantage is the high proportion of the total system mass dedicated to the hardware and plumbing of the separate components. This high mass increases startup time, material cost, and system total mass, which is undesirable for mobile applications such as powerplants for vehicles.

Another disadvantage of the unit process approach in small systems is the complexity of the plumbing system to connect the components. The complexity increases the likelihood of leaks in the final system, which presents a safety hazard, and also significantly increases the cost of the assembly process itself. Moreover, the requirement that each component have its own inlet and outlet provisions also adds considerable manufacturing cost to the components themselves.

A third disadvantage is the high surface area of the plumbing relative to the unit process hardware itself, which means that a disproportionately large amount of heat is lost through the connecting plumbing in small scale systems. This can drastically reduce the thermal efficiency of the system and adds cost and complexity associated with adequately insulating the plumbing system.

A fourth disadvantage to the unit process approach in small-scale systems is that this approach requires a large volume to package, as each component and its associated plumbing must be accessible for assembly and maintenance purposes. This is particularly disadvantageous in space-sensitive applications such as building fuel cell power stations, fuel cell vehicle refueling stations, and fuel cell mobile powerplant hydrogen generation.

Hydrogen is typically separated from the other reaction products using pressure swing adsorption (PSA) technology. The design of these PSA systems is largely dictated by the catalyst chemistry employed in the steam reformer and the low-temperature water gas shift reactor. These catalysts, typically based on nickel metal in the former and copper in the latter case, are extremely sensitive to poisoning and deactivation by sulfur or molecular oxygen. Thus, the incoming feed gas must be carefully treated to remove these materials. Further, the system must protect the catalysts against these agents during startup, shut-down, and during intervals when the system is shut down. Especially in the case of molecular oxygen, exposure of the active catalyst can lead to catalyst damage and even create a safety hazard through pyrophoric oxidation of the finely-divided base metal catalysts.

Several steps are necessary in conventional systems to prevent damage to the reforming and Low Temperature Shift (LTS) catalysts.

(1) During operation, the incoming fuel must be treated to remove both sulfur and molecular oxygen. Sulfur in particular is generally reduced below 1 part per million, and more preferably below 100 parts per billion. This is typically achieved through a combination of a partial oxidation to remove oxygen followed by a hydrodesulfurization (HDS) process. Such systems typically require recycle of high-temperature, hydrogen-rich product gas to the inlet through the use of a gas compressor or a fluid ejector as exemplified by U.S. Pat. No. 3,655,448 to Setzer, U.S. Pat. No. 4,976,747 to Szydlowski and Lesieur, and U.S. Pat. No. 5,360,679 to Buswell. et al. Because accurate temperature control is required for the HDS reaction, several heat exchangers as well as active temperature control logic circuits and flow control valves are also required. Provision of these reactors, heat exchangers, valves, as well as sensors and controls adds significantly to the complexity of conventional systems.

(2) Startup of conventional system requires bringing all of the components to near operating temperature, usually while blanketed in inert gas, then carefully initiating the reaction. Before the system is at operating conditions, full removal of sulfur and molecular oxygen is not guaranteed, so the process feed gas must be vented to the atmosphere, wasting fuel, generating air pollution, and creating a potential safety hazard while further increasing system complexity. Because the added components for fuel pretreatment add significant mass to the system, they also extend the warmup time required for hydrogen production. In situations with a variable hydrogen demand, this can create a need for extensive onsite hydrogen storage to supply the hydrogen demand while the system reaches operating conditions.

(3) During shutdown and periods when the conventional system is not operating, the reaction system is typically purged with inert gases under pressure. Alternatively, substantially leak-tight valves must be supplied to prevent ingress of atmospheric air to the unit with the resultant catalyst deactivation/damage.

For large-scale applications the added cost/complexity of the conventional systems does not adversely affect the system economics. When this traditional approach is applied to small-scale systems, however, the relative cost of these added components becomes disproportionately large, and the resulting hydrogen cost is dominated by the cost of the system. Accordingly, it is not advantageous to simply scale down large scale systems if a small scale system is desired.

Conventional steam reformer systems for natural gas and other light hydrocarbons fall into two broad classes. In the first, the reactors are operated at or near ambient pressure at low temperatures (typically less than 650° C.). This is typical of conventional systems designed for small-scale applications producing impure hydrogen. For pure hydrogen to be produced, the reformer product must be compressed to high pressure for subsequent cleanup via PSA, metal separation membranes, or other conventional techniques. Because steam reforming creates additional moles of gas, the compression of the product gas is very energy-intensive and requires expensive and complicated compression and intercooling equipment. The second class of reformers is typically used in large-scale applications and is operated at high pressures (often above 20 bar). Because of the thermodynamics of the steam reforming reaction, these high pressure reactors must be operated at much higher temperatures, often approaching 900° C., to attain adequate conversion of the hydrocarbon fuel to hydrogen. The higher temperatures and pressures require the use of more expensive materials of construction than are employed in the low-pressure systems, but this is more than offset by the reduction in reactor volume obtained due to enhanced chemical reaction rates. Unfortunately, in small-scale systems, the provision of compression and pumping equipment to deliver the reactants into a high-pressure (20 bar or higher) reactor can undesirably increase the cost of such a system.

Conventional pressurized steam reformer systems often are operated with very high temperatures in the combustion products used to heat the endothermic reaction zone. This high temperature allows a reduction in the amount of heat transfer area required to complete the reaction, and thus a reduction in reformer cost. Often, the mode of heat transfer to the wall of the tubes in the conventional reformers is a combination of radiation and convection, with the combustion carried out in a conventional premixed or diffusion-flame burner. The operation of the primary steam reformer with such high gas temperatures can lead to significant excursions in the reformer tube wall temperature due either to poor control of the distribution of the hot gases or to poisoning of the reforming catalyst. If the catalyst for the endothermic steam reforming reaction is locally-poisoned, the heat flux from the combustion products to the wall can form a local "hot spot." In either case, the increase in the reformer wall temperature can lead to premature reformer structural failure, presenting both a safety and an operational liability.

Conventional systems for hydrogen generation through steam reforming of hydrocarbons have several inherent deficiencies which make them ill-suited to economical small-scale hydrogen production. The first is the requirement for strict control of sulfur and molecular oxygen concentrations in the steam reforming and LTS reactors. The second concerns the problems with operation in the ambient pressure regime where the large volume of reformate gas must subsequently be compressed prior to purification. The third is associated with operating the reactor in the high-pressure regime typical of large-scale units where appropriate compression and pumping equipment adds considerable cost at small scales. The final shortcoming is the risk of overheating the steam reforming reactor structure due to the very high gas temperatures employed in the combustors in conventional systems and their reliance on radiant heat transfer, especially in high-pressure systems as employed in large-scale applications.

It has been recognized previously that integrating the elements of the unit process more closely beneficially reduces heat losses and improves compactness. U.S. Pat. No. 5,516,344 to Corrigan describes a steam reforming system wherein the unit process elements are integrated into a common mounting rack having a reduced requirement for insulation and having improved compactness. This approach, however, undesirably retains the multiple connections and extensive plumbing characteristic of the unit process approach. Moreover, because of its complicated packaging, the assembly of the Corrigan system undesirably presents a significant challenge.

Another attempt at improving compactness is described in U.S. Pat. No. 5,733,347 to Lesieur, wherein the primary reforming reactor and the catalytic burner are integrated into a planar reactor with compact heat transfer surfaces. This reactor requires separate heat exchangers to cool the gas after the primary reformer, as well as separate reactors for the water gas shift. These all require interconnections, as do the array of planar reactors envisioned by Lesieur. These connections once again present the same drawbacks found in unit process reactor systems.

SUMMARY OF THE INVENTION

Accordingly, one object of the present invention is to provide a reactor for hydrogen production that avoids the problems associated with conventional systems.

Another object of the present invention is to provide a reactor for hydrogen production that is suitable for applications where less than 15,000 standard cubic feet per hour of hydrogen are required.

Another object of the present invention is to provide a reactor for hydrogen production that is safer and more cost efficient than conventional systems.

Another object of the present invention is to provide a reactor for hydrogen production that is less complex and is more space-sensitive than conventional systems.

Another object of the present invention is to provide for the production of hydrogen from a hydrocarbon fuel such as natural gas, propane, naphtha, or other hydrocarbons low in sulfur content (<100 ppm sulfur by mass).

Another object of the present invention is to produce hydrogen which is substantially pure (>99.99%) by separating impurities using a pressure swing adsorption (PSA) system.

Another object of the present invention is the provide for the elimination of the pretreatment of the fuel feed to the steam reformer for the removal of sulfur and molecular oxygen.

Another object of the present invention is the provide for the operation of the system in a mesobaric regime, between 4 and 18 atmospheres, where appropriate fluid compression devices of small capacity, low cost, high efficiency and high reliability are readily available, and the resultant thermal efficiency of the hydrogen production system is very high.

Another object of the present invention is to provide for the feedback control of the delivery of fuel and/or air to a catalytic combustor in proportions such that the peak temperature of the gases entering the primary steam reformer does not exceed a safe maximum temperature determined by the metallurgy of the steam reformer.

Another object of the present invention is to provide for the operation of a steam reforming system without a low temperature water gas shift reactor.

Another object of the present invention is to provide for the operation of a hydrogen production system with feedback control of product carbon monoxide content.

Another object of the present invention is to provide a process having a simplified system construction, operation, and control resulting in low cost and relatively fast start-up and shut-down.

These and other objects have been achieved by the present invention, the first embodiment of which provides a reactor, which includes:

a unitary shell assembly having an inlet and an outlet;

a flow path extending within the shell assembly from the inlet to the outlet, the flow path having a steam reformer section with a first catalyst and a water gas shift reactor section with a second catalyst, the steam reformer section being located upstream of the water gas shift reactor section;

a heating section within the shell assembly and configured to heat the steam reformer section; and a cooling section within the shell assembly and configured to cool the water gas shift reactor section.

Another embodiment of the present invention provides a reactor for the production of hydrogen from at least one selected from the group including natural gas, propane, liquefied petroleum gas, alcohols, naphtha, hydrocarbon fuels and mixtures thereof, the reactor including:

a unitary shell assembly having an inlet and an outlet;

a flow path extending within the shell assembly from the inlet to the outlet, the flow path including a convectively-heated catalytic steam reformer and a convectively-cooled water gas shift reactor.

Another embodiment of the present invention provides a method for producing hydrogen, which includes:

feeding at least one fuel selected from the group including natural gas, propane, liquefied petroleum gas, alcohols, naphtha, hydrocarbon fuels and mixtures thereof, into a reactor which includes a unitary shell assembly having an inlet and an outlet, and a flow path extending within the shell assembly from the inlet to the outlet, the flow path including a convectively-heated catalytic steam reformer and a convectively-cooled water gas shift reactor, whereby hydrogen is produced.

Another embodiment of the present invention provides a method for producing hydrogen from at least one fuel selected from the group including hydrocarbon fuel, natural gas, propane, naphtha, hydrocarbons with <100 ppm sulfur by mass, and mixtures thereof, which includes:

producing hydrogen by steam reforming the fuel; and substantially purifying said hydrogen with a pressure swing adsorption (PSA) system;

wherein prior to the producing, no pretreatment of the fuel to remove at least one impurity selected from the group including sulfur and molecular oxygen and mixtures thereof is carried out.

BRIEF DESCRIPTION OF THE FIGURES

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1b differs from FIG. 1a in that it has an integral catalytic burner.

FIG. 4 also depicts an outer housing and insulation system.

DETAILED DESCRIPTION OF THE PREFERRED EMBODIMENTS

Figure 1A:
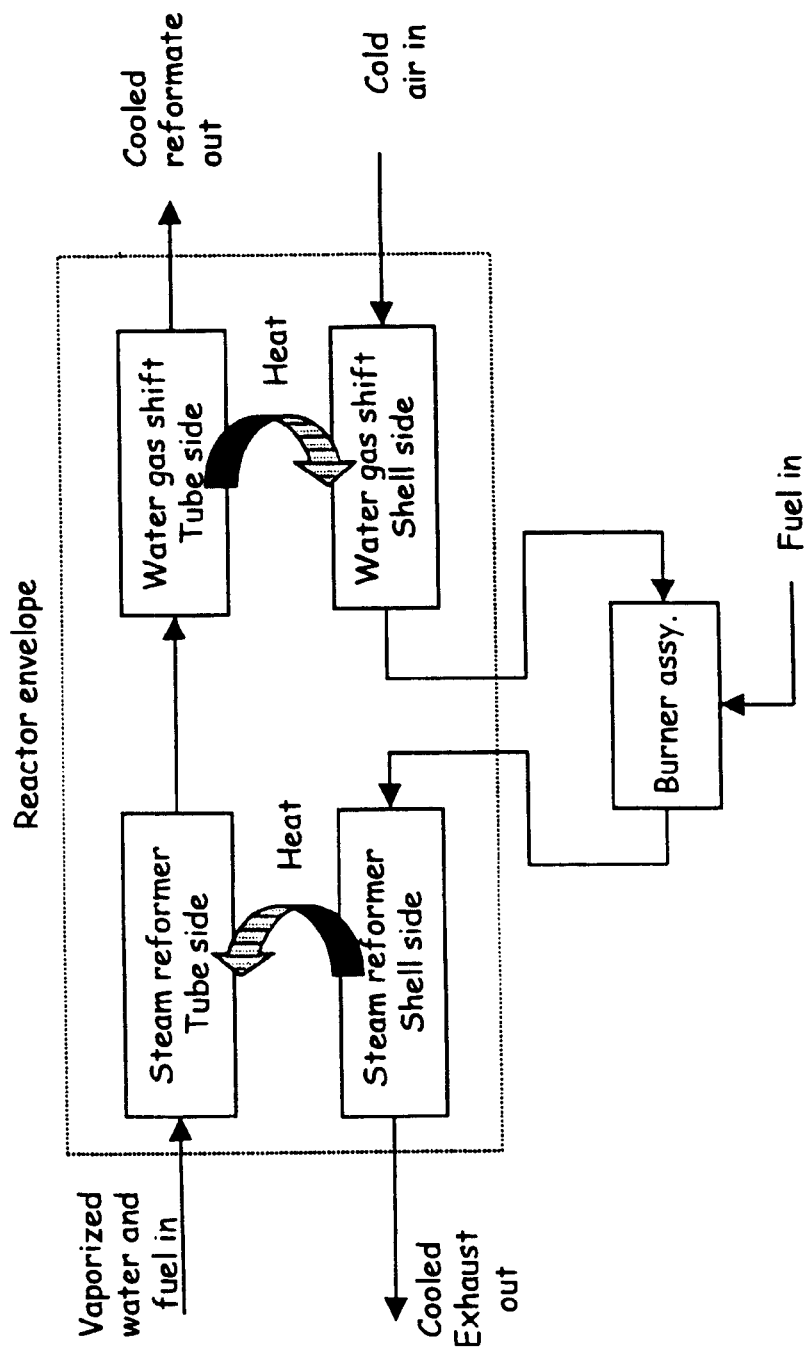
FIGS. 1a and 1b are schematics of two preferred embodiments of the reactor flow geometry on both the tube and shell sides.

Various other objects, features and attendant advantages of the present invention will be more fully appreciated as the same becomes better understood from the following detailed description of the preferred embodiments of the invention.

Preferably, according to one embodiment of the present invention, an integral reactor for the production of hydrogen from natural gas, propane, liquefied petroleum gas, alcohols, naphtha and other hydrocarbon fuels and mixtures thereof is provided where several components of the process system are combined into a single mechanical structure. These components will preferably include a convectively-heated catalytic steam reformer, a cooler for the reformate product from the steam reformer and a convectively-cooled water gas shift reactor. The reactor may additionally and optionally include a preheat section to heat the inlet feeds. The packing of this preheat section may additionally and optionally serve as a sulfur absorbent bed. The reactor may additionally and optionally include an adiabatic water gas shift reactor appended to the exit of the convectively cooled water gas shift reactor.

Preferably, the reactor of present invention includes a tubular array wherein the fuel and water to be reformed flow through the tubes, and the cooling and heating fluids flow outside the tubes, with a single reforming side inlet tube header and a single reforming side outlet tube header. The interior of these tubes is preferably provided with a catalyst in the form of a coating, a monolith, or as a loose packing of pellets, extrudates or the like. Preferably, the reactor also includes a shell assembly, with a means of thermal expansion relief, one or more inlets for a cooling medium for the water gas shift reactor, and one or more outlets for the hot combustion product. The reactor shell assembly may additionally and optionally have one or more outlets for heated coolant for the water gas shift reactor and one or more inlets for the hot combustion product to heat the steam reforming reactor.

Preferably, the reactor tube array surface area may be enhanced on the shell side of the tubes for the purposes of aiding heat transfer between the shell side fluid and the tube walls. The surface augmentation may be accomplished through the use of twisted tubes, finned tubes, rifled tubes, plate fins, by means of a loose packing material, or by other means apparent to one skilled in the art.

Another preferred embodiment of the invention provides that the fluids flowing outside the tubes in the shell side may be forced to flow across the tubular array, substantially normal to the axis of the tubes, by baffles. These baffles may be employed with or without the surface area enhancements which are another embodiment of the present invention.

Another preferred embodiment of the present invention provides that a catalytic burner may be incorporated in the shell side of the reactor assembly. This catalytic burner may be provided with one or more inlets for fuel delivery. This burner may also be provided with a means of mixing the fuel and heated air. This burner may also be provided with a means of preheat and/or ignition. This burner may also be provided with one or more temperature sensors.

Preferably, the steam reforming catalyst is resistant to poisoning by sulfur and molecular oxygen.

Preferably, the water gas shift catalyst is resistant to poisoning by sulfur.

Preferably, the reactor includes an outer housing and insulation assembly.

Referring to FIG. 1a, one embodiment of the overall flow geometry of the reactor of the present invention is provided with an inlet on the tube side for entry of vaporized, mixed water and fuel, which flow through a first region packed with steam reforming catalyst, where catalytic steam reforming takes place, and a second region packed with water gas shift catalyst, where the water gas shift reaction takes place, after which the reformed gases exit the reactor. A second fluid stream enters the shell side near the outlet of the tube side, and flows generally in counterflow to the reformate flowing through the tube side. This second fluid stream is lower in temperature than the exiting reformate, and it removes heat from the water gas shift portion of the tube side of the reactor. In the embodiment of FIG. 1a, the heated air then exits the shell side through an outlet port and is conveyed to an external catalytic combustor, where the heated air is mixed with one or more fuel streams and combusted over a catalyst or in a conventional burner. The hot combustion product is then returned to the shell side of the reactor, where the hot combustion product convectively heats the lower temperature reformate in the steam reformer section of the tube side.

Figure 1B:
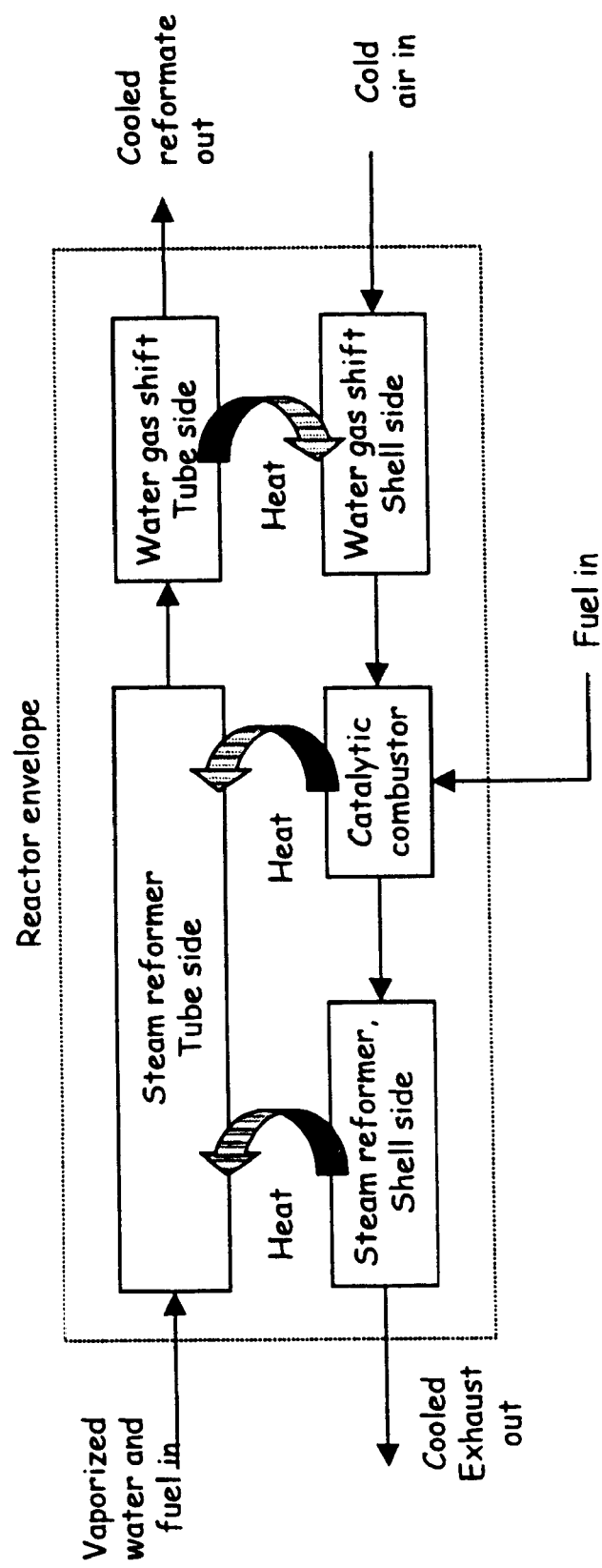

Another preferred embodiment of the overall flow geometry of the present invention is shown in FIG. 1b, which differs from that of FIG. 1a in that the catalytic combustor is located within the shell side of the reactor. In the embodiment of FIG. 1b, the fuel for the combustor is introduced into the shell-side fluid flow, and the fuel-air mixture is combusted on a catalyst, which is located inside the reactor shell and intimately in contact with the reactor tube walls.

Figure 2:
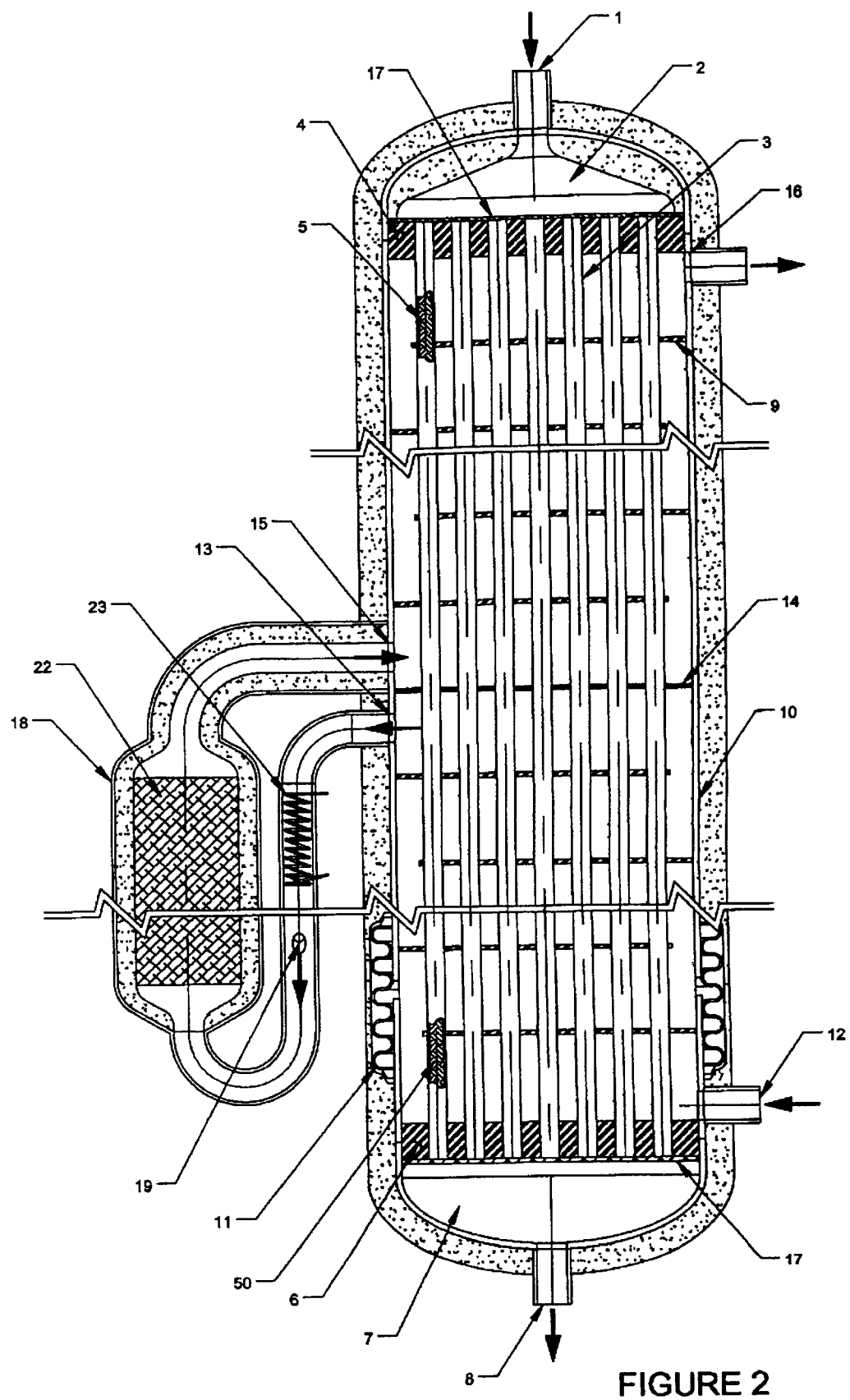
FIG. 2 shows a preferred embodiment of the reactor of the present invention without an internal catalytic burner and without extended surfaces on the tubes in the tubular array, which is provided with baffles to create a multi-pass cross-flow geometry in the shell side fluid pathway.

Referring to FIG. 2, the preferred reactor of the present invention has an inlet for mixed, pre-vaporized fuel and steam 1, which communicates with a plenum 2, which distributes the mixture to the array of reactor tubes 3. These reactor tubes are mounted to the inlet tube header 4 by welding, brazing, swaging or other processes capable of creating a leak-tight joint in the materials of construction. Most preferably, the reactor tubes 3 are joined to the inlet header 4 by brazing or welding. The reactor tubes are provided, as is illustrated in the cut-away view of FIG. 2, with a charge of steam reforming catalyst material 5. This catalyst material 5 may be a loose packing as illustrated, or may be a catalytic coating, or may be a section of monolithically-supported catalyst. Such coated, packed bed, or monolithic catalyst systems are well known to those skilled in the art. The reactor tubes are also provided with a water gas shift catalyst 50, which is located downstream from the steam reforming catalyst, 5. The tubes 3 are further joined to a outlet tube header 6 by processes similar to those for attaching the tubes to the inlet header 4. The outlet tube header 6 communicates with an outlet plenum 7, which delivers the reformate 2 product to an outlet port 8. The reactor tubes 3 pass through holes in one or more baffles 9, which share the same geometrical pattern of holes as the inlet and outlet headers 4 and 6. The spacing between these baffles is governed by the allowable pressure drop and required heat transfer rate on the shell side of the reactor. The baffle spacing may be different in various portions of the reactor. The baffles 9 shown in FIG. 2 are chorded to allow fluid to flow around the end of the baffle and along the tube axis through a percentage of the cross-sectional area of the shell. The baffles are chorded between 50% and 10%; more preferably they are chorded between 40% and 15%, most preferably they are chorded between 30% and 20%. The direction of the chorded side alternates by 180 degrees such that fluid is forced to flow substantially perpendicular to the long axis of the tubes 3. Alternative baffle designs are apparent to one skilled in the art and are included within the scope of the present invention. Preferred examples of alternative baffle designs include baffles chorded in more than one location, circular baffles of alternating ring and circle shapes, and wedge-shaped baffles.

The baffles fit with a close tolerance to allow a sliding fit to the shell assembly 10. The shell assembly is secured to either one or both of the inlet and outlet headers by welding, brazing, swaging, or other methods which are apparent to one skilled in the art. The close tolerance fit between the baffles and the shell is chosen such that the baffles will not bind against the shell wall during assembly and operation while still minimizing leakage between the baffles and the shell wall. If the shell 10 is rigidly secured to both headers it is especially preferable to provide a means for relative thermal expansion and contraction between the reactor tubes and the shell to occur without undue restraint. In FIG. 2 thermal expansion is provided for by a corrugated tube or bellows 11. If the shell is fixed to only one header, relative expansion may be provided for with a sliding fit and seal system between the shell bore and the outer surface of the other reactor header to minimize leakage while allowing free thermal expansion of the tubular array. Other means of providing free thermal expansion of the tube array will be apparent to one skilled in the art, and are included within the scope of the present invention.

The reactor of FIG. 2 employs the overall flow geometry of FIG. 1a, and is thus provided in the shell-side of the water gas shift section with a cold air inlet 12 as well as a hot air outlet 13. Most of the shell-side air is prevented from bypassing the hot air outlet 13 by an unchorded baffle 14, which fits snugly against the shell assembly 10 inner wall. The reactor is further provided in the shell side of the steam reforming section with a hot combustion product inlet 15 and a cooled combustion product outlet 16. The inlets and outlets are depicted as single tube sections in FIG. 2, but it must be understood that other inlet and outlet types are possible, including ring manifolds and multiple tube fittings. Such alternative embodiments may be advantageously employed to reduce thermal stresses in the tubes, to modify heat transfer characteristics, or for other purposes apparent to one skilled in the art.

The reactor of FIG. 2 is provided with an external burner assembly 18. In the embodiment of FIG. 2 this burner assembly is a catalytic burner with catalyst zone 22, and it will be understood that alternative burner designs are known in the art which employ premixed or diffusion burning or combinations thereof. Other preferable types of burners are also apparent to one skilled in the art, and it is intended that the choice of external burner shall not limit the reactor of the present invention. The external burner assembly 18 is provided with at least one fuel injection port 19. The air inlet may additionally be provided with at least one air preheater element 23. This preheater element may alternatively be replaced or augmented with a pilot light, a spark ignitor, or an electrically heated catalyst. These and other modifications to the burner assembly are apparent to one skilled in the art.

The tubes 3 are preferably filled with at least two catalyst systems. In the steam reforming zone, a catalyst 5 active for steam reforming is used, while in the water gas shift zone a catalyst 50 active for water gas shift but substantially inactive for methanation is employed. These catalyst systems may be in the form of surface coatings, a packed bed of loose particles, or as a monolithically-supported catalyst of the shape of the inside of the tubes. Most preferably the catalyst is either coated or is in the form of a packed bed. In FIG. 2, the catalyst is a packed bed of loose particles retained between the inlet and outlet headers by catalyst support screens 17. Prior to the steam reforming zone, a zone of chemically inert packing may be provided as a heat transfer media only. In this configuration, the reactants may be preheated in order to bring their temperature to a level where the catalytic steam reforming reaction occurs at a meaningful rate. An preferred embodiment of the present invention replaces the inert packing in this preheat zone with a sulfur absorbent such as zinc oxide. This sulfur absorbent can serve as a guardbed to protect the steam reforming catalyst from poisoning by sulfur.

In a preferred embodiment, the steam reforming catalyst is capable of operation in the presence of less than 100 ppm of sulfur by mass in the fuel feed and is insensitive to the presence of molecular oxygen in the fuel feed. More preferably, the catalyst is capable of being shut down from operation and restarted without the use of reducing or inert gas. Most preferably, the catalyst active metal is chosen from one or more of those in group VIIIB of the periodic table, incorporated herein by reference. Examples of the preferred metals are ruthenium, rhodium, iridium, platinum and palladium. These metals are preferably supported on a ceramic support of high surface area. Preferred examples of supports are oxides of aluminum, zirconium and magnesium, as well as mixed oxide spinels such as calcium aluminate, nickel aluminate or magnesium aluminate. Other ceramic supports will be apparent to one skilled in the art and are included in the scope of the present invention.

In a preferred embodiment, the water gas shift catalyst is capable of operation in the presence of less than 100 ppm of sulfur by mass in the fuel feed and can be started in the presence of partially reacted mixtures of fuel and water, i.e. reformate from the steam reforming reactor. The catalyst also preferably does not require inert gas for shutdown. An example of a preferred catalyst is a finely divided mixture of oxides of iron and chromium, marketed as high temperature water gas shift, or "ferrochrome" catalyst. A second example of a preferred catalyst includes platinum supported on aluminum oxide, with or without promotion by oxides of cerium or other metal oxides.

Figure 3:
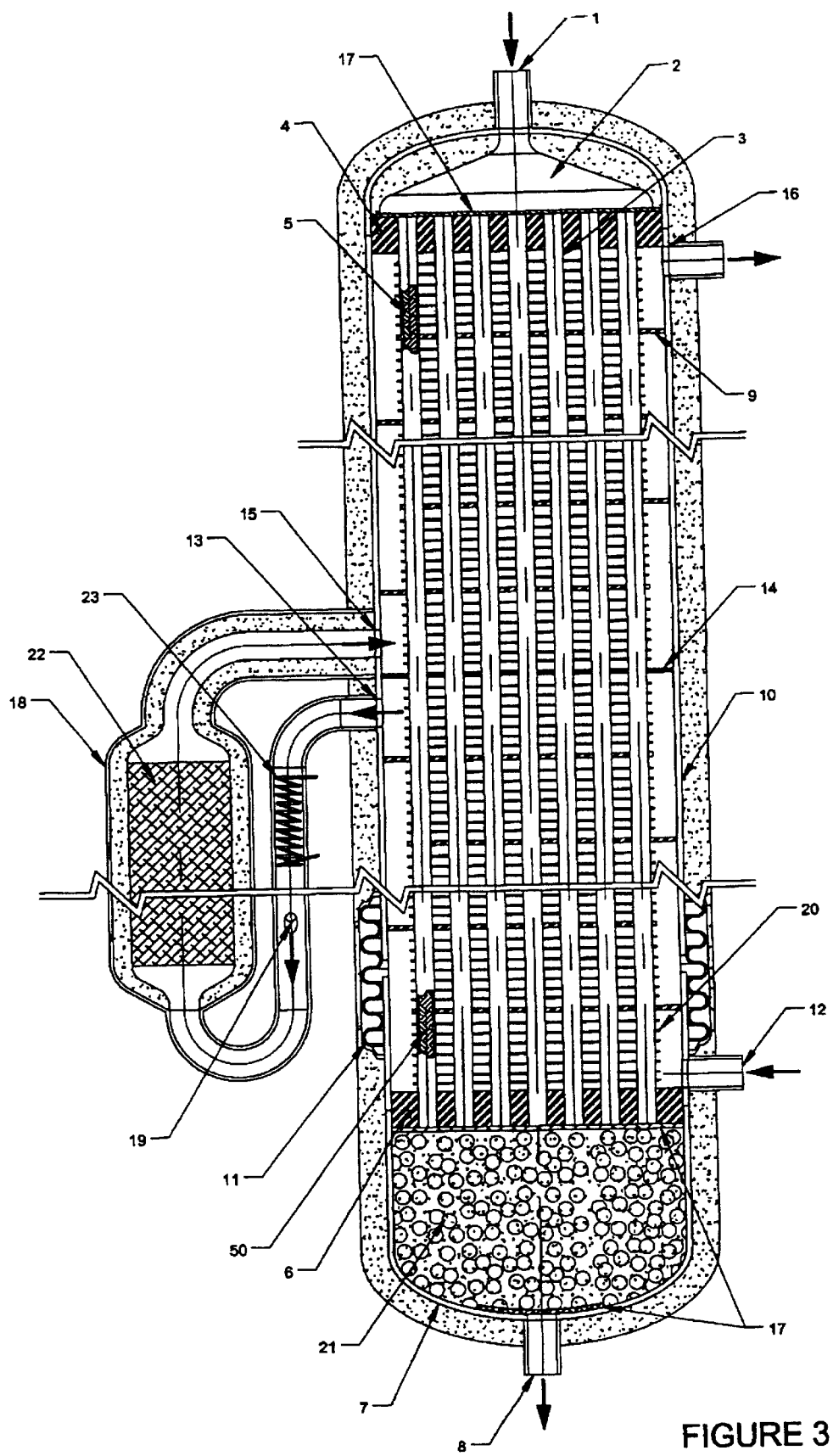
FIG. 3 shows a preferred embodiment of the reactor of the present invention with plate fin heat exchange surfaces attached to the tubes on the shell side and an adiabatic water gas shift reactor zone placed after the convectively cooled water gas shift reactor zone. This figure also illustrates the preferred combination of extended tube surfaces and baffles.

Referring to FIG. 3, a preferred embodiment of the reactor of the present invention is depicted which employs both baffles 9 as in FIG. 2 as well as extended heat exchange surfaces on the outer walls of the reactor tubes 3. In this case, a plurality of closely-spaced plate fins 20 are provided. These fins may be bonded to the reactor tube by brazing, or more preferably by hydraulically expanding the tubes 3 into close contact with the plate fins 20. The plate fins, like the baffles 9, also have a pattern of holes which is identical to that in the inlet and outlet headers.

FIG. 3 also shows an adiabatic water gas shift reactor 21 appended to the outlet tube header 6. This reactor increases the volume of catalyst accommodated without increasing the usage of the expensive metal alloy reactor tubing. The additional catalyst volume can be used to better approach the equilibrium conversion of the water gas shift reaction at the outlet temperature conditions. This is typically desired when the outlet temperature of the reformate from the water gas shift reactor is below 400° C.

Figure 4:
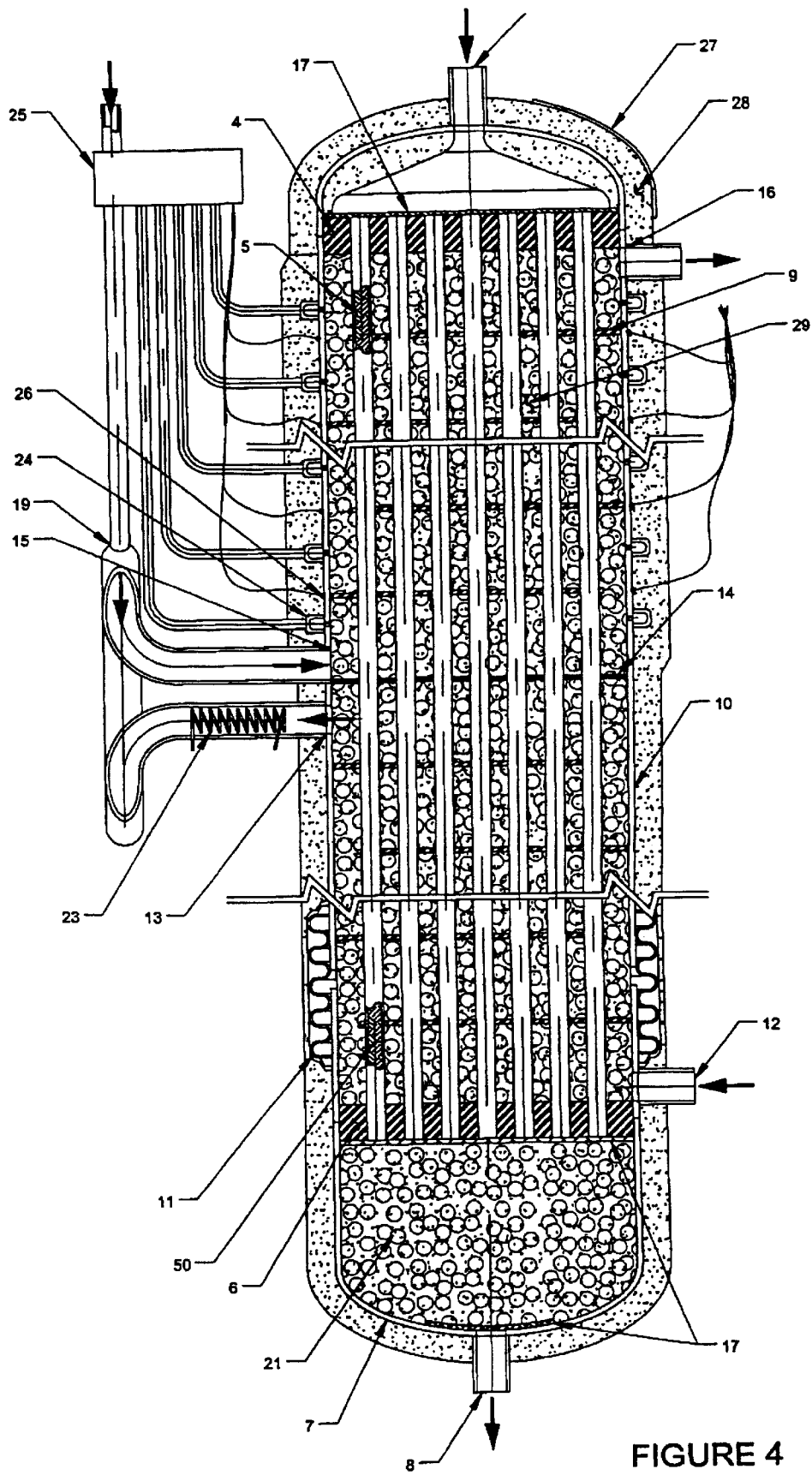
FIG. 4 shows a preferred embodiment of the reactor of the present invention without baffles, and with shell side extended surface comprising loose packing material. This figure also shows one manifestation of a catalytic burner included within the reactor shell.

FIG. 4 shows a preferred embodiment of the reactor of the present invention wherein the overall flow geometry is that of FIG. 1b. In this embodiment the shell side is packed with a loose packing material to provide extended surface area for the tubes 3. It should be understood that other types of extended surfaces are possible, such as finned tubes, rifled tubes, twisted tubes, and combinations thereof. All of these eliminate the possibility of using baffles in conjunction with the extended surface area, whereas plate fins and loose packing do not. It should be noted that in the embodiment of FIG. 4 baffles are not employed, and the overall flow is substantially parallel to the axis of the tubes 3. The embodiment of FIG. 4 also includes a catalytic burner integrated within the reactor shell. The catalytic burning is accomplished by a zone of packing 29 which is catalyzed with an appropriate combustion catalyst, such as mixtures of palladium and platinum supported on a ceramic support. The size of this catalyzed zone is chosen to meet the requirements of the specific application, and may fill the entire reactor shell above the unchorded baffle 14. Alternatively, the unchorded baffle 14 may be omitted, and the heated air from the water gas shift zone may proceed directly to the steam reforming zone where catalytic combustion will occur.

Near the shell side inlet 15 to the catalytic combustion zone there is a fuel distribution assembly 24, which allows fuel to be introduced into the catalytic combustion zone. Alternatively, and preferably, the combustion zone may be provided with more than one fuel distribution assembly 24, which may be employed to control the temperature profile in the combustion zone. It should be understood that any number of configurations for this fuel distribution assembly are possible and may be employed in the reactor of the present invention. The one or more fuel distribution assemblies 24 are provided with a fuel feed controller 25, and the reactor is provided with at least one temperature sensor 26 to be used in control of the combustion temperature. The temperature sensor 26 is illustrated as located at the shell of the reactor, but may be alternatively located in a thermowell located in a reaction tube or at other locations within the reactor. The intimate contact between the catalyst and the reactor tubes allows very good heat transfer, but makes temperature control more difficult as well. Another preferred embodiment of the present invention replaces the loose, catalyzed packing with a catalyzed monolith provided with a pattern of holes which are larger than the reactor tube outer diameters. This type of monolithic combustion catalyst, because it is aligned by the shell assembly, and does not contact the reactor tubes, will pose less of a danger to overheating the reactor tubes and causing the formation of hot spots. Even if the monolithic combustion support did contact the tube walls locally, hot spotting would be less likely as combustion is distributed throughout the monolith volume, rather than being localized only at the tube wall.

FIG. 4 also depicts an outer housing 27 that can be constructed to extend over the entire outer surface of the insulation system 28 or a portion thereof, and which is only depicted over a small segment of the insulation system 28. The insulation system may be constructed from one or more layers of insulation materials, and may be either rigid or flexible. The precise amount and type of insulation employed is dependent upon a variety of factors such as allowable heat loss, maximum surface temperature of the outer housing 27, and the mode of structural support for the reactor. These variables do not materially affect the performance advantages of the reactor of the present invention, and any number of possible insulation configurations are considered within the scope of the present invention. The outer housing 27 also does not materially affect the operation of the reactor and is designed instead based upon factors such as structural requirements, environmental conditions, and aesthetics. Thus, any number of configurations for the outer housing are considered within the scope of the present invention.

Several surprising and unexpected advantages of the reactor of the present invention are apparent when it is compared to the conventional systems.

The first advantage is the great simplification in the construction of the reactor system afforded by combining the steam reforming and water gas shift reactors and their associated heat transfer functionalities into a single mechanical device. This eliminates the requirement for separate inlet and outlet zones, fittings, and interconnecting plumbing. This advantage is even further evidenced in systems incorporating the feed preheat function and/or the internal catalytic burner. In small hydrogen generation applications (<15,000 scf/hr or 1 ton per day), this reduction in physical components and interconnects can greatly reduce the cost of the completed system.

A second advantage is the great reduction in heat loss achieved by the reactor of the present invention when compared to the unit process approach of the conventional systems. In part because the number of fittings and interconnecting plumbing is decreased in the novel reactor of the present invention, the amount of heat transfer surface with the ambient environment is greatly diminished. Consequently, the heat lost to the ambient environment is desirably proportionally reduced. This heat loss can otherwise undesirably form a large energy requirement in conventional small-scale, hydrogen-generating reactors. The reduction in heat loss achieved by the present invention leads to a higher energy efficiency of the reactor and a faster warmup time. Additionally, the low heat loss of the reactor of the present invention allows it to be maintained in a hot condition for extended periods of time without generating hydrogen and without consuming much fuel, which desirably makes "hot standby" of the novel reactor more practical than in conventional reactors.

A third advantage of the reactor of the present invention is its ability to start up from a cold condition more rapidly than conventional reactors. This is believed to be due to both the lower structural weight of the reactor and its lower heat loss when compared to conventional discrete reactors and heat exchangers. The rapid warmup capability allows the reactor of the present invention to be operated intermittently without excessive penalties in warmup time or warmup fuel usage.

Preferably, the present invention is carried out without pretreatment of the fuel feed to the steam reformer for the removal of sulfur and molecular oxygen. Pretreatments which are preferably excluded from the present invention include any or all of partial oxidation, hydrodesulfurization, adsorption, or absorption. Other such pretreatment methods known to one of ordinary skill in the art are preferably excluded as well.

Low-pressure water and hydrocarbon fuel are admitted to separate or combined fluid compression devices; and they are subsequently heated to their vaporization points and admitted to a primary steam reforming reactor. This steam reforming reactor is provided with a catalyst which is resistant to poisoning by both sulfur and molecular oxygen, and is preferably based upon catalytically-active group VIIIB metals such as ruthenium, rhodium, iridium, platinum, palladium or combinations thereof supported on a ceramic support of high surface area. In this primary steam reforming reactor, the vaporized fuel and steam are further heated by a separate stream of hot combustion product which is separated from the reactants by the walls of the reactor, which also form heat exchange surfaces. These heated gases are then encouraged to react by the aforementioned catalyst to form a hydrogen-rich product gas with a composition near its equilibrium value at the reactor outlet conditions. This hydrogen-rich gas is then cooled and passed over a second catalyst which is also sulfur resistant, and is active for the water gas shift reaction while being substantially-inactive for the reverse of the steam reforming reaction, the methanation reaction. An example of such a catalyst is a finely divided mixture of oxides of iron and chromium, which is well-known in the art as "high temperature" water gas shift or "ferrochrome" catalyst. The hydrogen rich gas stream has much of its carbon monoxide converted to carbon dioxide and hydrogen in the water gas shift reactor, and exits with a carbon monoxide concentration between 0.3% and 4%, at a temperature above 200° C.

In conventional systems, a further low-temperature water gas shift reactor is provided, whereas in the system of the present invention no such reactor is provided, as an active, sulfur-tolerant catalyst operable at such low temperatures is not easily made. The product gas mixture is then further cooled either by heat exchange with ambient air or cool water or by quenching with cool water in an evaporative cooler. Condensed water is then removed from the gas via a separator, and the thus partially-dried gas mixture is admitted to the PSA purification system. In the PSA system, impurities are adsorbed from the gas while the product hydrogen is delivered at a high purity and at an elevated pressure (slightly below the steam reformer pressure). The impurities are then purged with a small portion of the hydrogen product at low pressure and are delivered as a fuel to a catalytic combustor, which is provided with an exit temperature sensor and a means of controlling the rate of admission of air. The rate of air admission is thus controlled such that the exit temperature from the combustor is below the maximum allowable temperature of the reformer metallurgy. This hot combustion product is then ducted to a heat transfer interface in the steam reformer to provide heat for the endothermic reaction therein to proceed. The combustion product, at a reduced temperature, may then be used to heat and vaporize the pressurized water and, if desired, fuel streams.

As described below, the rate of air admission is controlled by a feedback loop based upon the outlet temperature of the catalytic combustor. The calorific value of the low-pressure mixed fuel gas expelled from the PSA system is determined by the degree of hydrogen purity required. A feedback control system based upon a product carbon monoxide sensor based on either infrared or electrochemical principles will be used to set the rate at which the PSA system purges itself of contaminants. When high purity is desired, a high purge rate is employed and the calorific value of the low-pressure gases is high. When less stringent purity is required, the rate of purging may be lower, and the calorific value of the purged gases may be correspondingly lower. Indeed, the purge rate may be reduced to a point where the calorific value of the purge gas is too low to sustain the reactor temperature, at which point unreacted hydrocarbon fuel may be provided from a valve to make up the deficit. Whereas the carbon monoxide concentration is of special significance for fuel cell applications, in other applications it is understood that another impurity may be more critical, and feedback based upon concentrations of that species may accordingly be employed.

Figure 5:
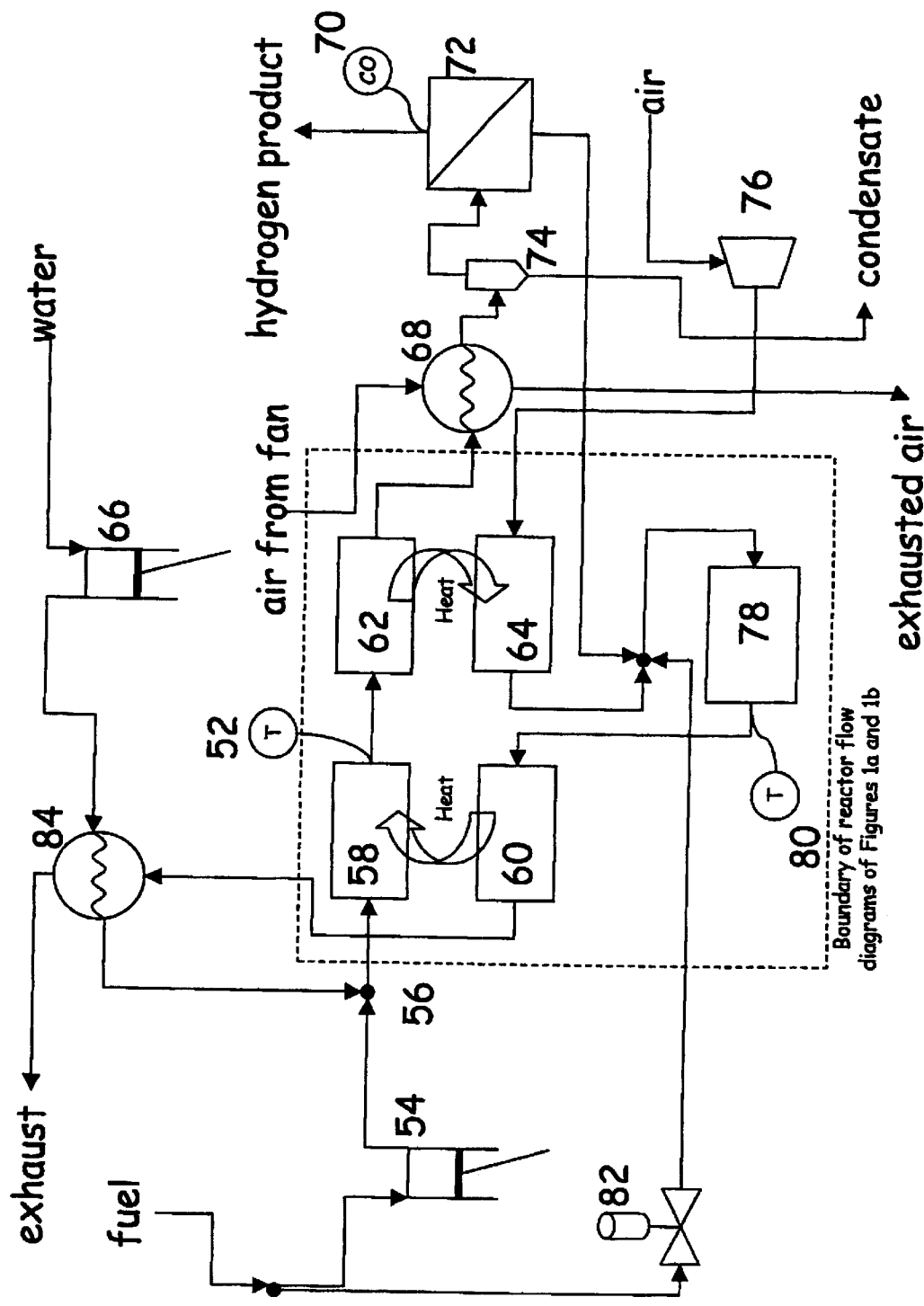
FIG. 5 is a schematic of the hydrogen production system of a preferred embodiment of the present invention.

Referring to FIG. 5, the hydrogen production system of the present invention can process hydrocarbon fuels such as natural gas, town gas, refinery off-gas, propane, liquefied petroleum gas, naphtha, alcohols or any other hydrocarbon fuel with a sulfur content less than 100 parts per million (ppm) by mass. Natural gas or liquified petroleum gas are preferred. More preferably, the sulfur content is less than 75 ppm, most preferably, the sulfur content of the fuel is less than 50 ppm. The second feed to the system is water, which is subsequently chemically reacted with the fuel to yield hydrogen. This water feed must be conditioned to remove particles, organics, and ionized species. This may be achieved using methods apparent to one skilled in the art. The molar ratio of the water to the fuel is such that the ratio of water molecules to carbon is between 2.5:1 and 8:1. More preferably, the ratio is between 3:1 and 5:1.

The water feed to the system is pressurized using an appropriate pump 66 to a pressure greater than the operating pressure of the system, which is preferably 4 atm to 18 atm. The pressurized water is then admitted to a heat exchanger 84 where it is heated by a second fluid, which is the cooled combustion product exhausted from the steam reforming reactor hot side 60. It must be understood that this heat exchanger may include more than one individual unit, and that alternative strategies may be employed to heat the feed water such as by removing heat from the hot hydrogen-containing gas exiting the water gas shift reactor 62, or from other high temperature streams in the system. Irrespective of the exact arrangement of the heat exchange means, sufficient energy is transferred to the water to cause it to vaporize and allow it to be mixed with the fuel at 56.

The fuel is pressurized using compressor 54. This device may be a pump if the fuel is a liquid, and may also be replaced and/or augmented by a steam ejector employing pressure energy stored in the vaporized water to pressurize the fuel. The fuel is mixed with the vaporized water at 56. The resulting pressure of the mixed fuel and water preferably exceeds that of the steam reforming reactor 58, which is between 4 atm and 18 atm. This requires that sufficient energy be imparted to one or more of the fluids to maintain the resulting mixture in the vapor phase at the steam reforming reactor inlet. This may require the addition of an evaporator for a liquid fuel, or may be achieved through superheat of the vaporized water.

The steam reforming reactor includes a high pressure, cold side 58 wherein is disposed a quantity of catalytically active material as well as a lower pressure, hot side 60. The mixed, vaporized fuel and water enter the cold side 58 and are heated by the hot combustion product which flows through the hot side 60. These fluids are prevented from mixing by the shared structure of the reactor, which forms a heat exchange surface, or a plurality of heat exchange surfaces. The pressure of the fluid in the cold side of the reactor is between 4 atm and 18 atm. More preferably, the pressure is between 5 atm and 15 atm. Most preferably, the pressure is between 10 atm and 15 atm. The catalyst disposed in the cold side of the reactor is resistant to both the adsorption of sulfur compounds and oxidation by both steam and molecular oxygen. The catalyst preferably includes an active metal or mixture thereof supported upon a ceramic support material of high surface area. Preferably the catalyst active metal or metals is selected from the group VIIIB metals of the periodic table, incorporated herein by reference. Most preferably the catalyst active metal includes one or more of the following group VIIIB metals singly or in combination; ruthenium, iridium, rhodium, platinum and palladium. The temperature of the reacting mixture is increased in the steam reformer. The exit temperature of the heated reformate, or hydrogen rich mixture, depends upon the fuel, pressure, steam to carbon ratio and metallurgy of the reactor. The exit temperature from the cold side 58 is preferably between 500° C. and 900° C. More preferably, the temperature is between 600° C. and 800° C. Most preferably, the temperature is between 700° C. and 800° C.

This heated reformate gas passes from the cold side 58 of the steam reformer to the hot side 62 of the water gas shift reactor, part or all of which is cooled by cooler, lower pressure air flowing through the cold side of the water gas shift reactor 64. Like the steam reformer, the water gas shift reactor is thus provided with one or more heat transfer surfaces for transferring heat between these two fluids. Alternatively, the hot gases may be partially or completely cooled to the water gas shift reactor temperature before being admitted to its hot side 62. A catalyst active for water gas shift and inactive for methanation is disposed within the hot side of the water gas shift reactor 62. This catalyst must also be resistant to poisoning by sulfur compounds. An example of a commercially-available catalyst is a finely divided mixture of oxides of iron and chromium which is formed into pellets or tablets. The gas exiting the water gas shift reactor hot side 62 is preferably greater than 200° C. in temperature. More preferably, the gas is greater than 250° C. and less than 400° C. in temperature. Most preferably the gas is greater than 275° C. and less than 350° C.

The hot, hydrogen rich reformate is then passed through a cooler 68. This is depicted in FIG. 5 as being cooled by cool external air from a fan. Alternatively, the cooling may be accomplished via a series of heat exchangers including heating the water feed to the system and cooling with air. Alternatively, the reformate may be cooled by heat exchange with cool water. Alternatively, the reformate may be cooled through the use of an evaporative chiller using directly injected water. These embodiments may also be combined in a variety of configurations apparent to one skilled in the art, which do not in any way limit the scope of the present invention. The reformate exits this cooler 68 at a temperature below 100° C. More preferably, the temperature is between 80° C. and 25° C. Most preferably the temperature is between 60° C. and 30° C. Because the reformate gas is pressurized, the cooling will cause some portion of the water vapor to condense. This condensed water vapor, and any condensed fuel residuals, is then removed in a condensate separator 74.

The partially dried reformate is then admitted to the Pressure Swing Adsorption (PSA) system 72. PSA systems are known to those skilled in the art. The PSA system 72 removes impurities from the reformate, thus delivering a substantially pure hydrogen product at a pressure slightly lower than the reactor pressure due to pressure drop. The contaminant species are purged from the PSA system 72 using some of the pure hydrogen product. This purge gas is rejected at lower pressure than the hydrogen is delivered as product. It is also possible to provide a vacuum pump to reduce the pressure at which the low-pressure exhaust is rejected to thus improve the performance of the PSA system 72. The average hydrogen purity may be controlled by varying the rate with which the beds in the PSA system 72 are purged. This rate of purging may be controlled via a feedback loop of the present invention which is described herein. The PSA product outlet may optionally be provided with a gas composition sensor 70 for use in the control of the system.

The low-pressure purged gases from the PSA system 72 are fed to the catalytic combustor 78, where they are mixed with the process air which is compressed by the feed compressor 76, and heated by the reformate in the cold side of the water gas shift reactor 64. The catalytic combustor is provided with an inlet end and an outlet end, with a means of preheat or ignition, a charge of combustion catalyst, and an outlet temperature sensor. The flowrate of air delivered by the feed compressor 76 is regulated such that the temperature of the combusted mixture does not exceed the maximum temperature allowed by the metallurgy of the steam reformer. The strategy for this control is disclosed later in this document. The system is also provided with an auxiliary fuel metering valve 82, which may deliver low-pressure fuel as shown, or may be required to deliver pressurized fuel, to match the pressure utilized in the combustion loop. This valve may be used to deliver fuel during system startup, and to augment the low-pressure reject fuel gas from the PSA system 72 if it is insufficient to supply the steam reformer heat requirements.

The hot combustion product is delivered to the hot side of the steam reformer 60, where it is cooled in exchanging heat with the reformate. It then flows through the water preheater 84 to transfer heat for the purpose of vaporizing the reactants. After leaving the water preheater 84, the combustion product is sufficiently cooled to be exhausted to the atmosphere. This exhaust may be unrestricted, flow through a back-pressure regulator, or flow through a gas turbine or other work recovering device. Such modifications are included within the scope of the present invention.

Figure 6:
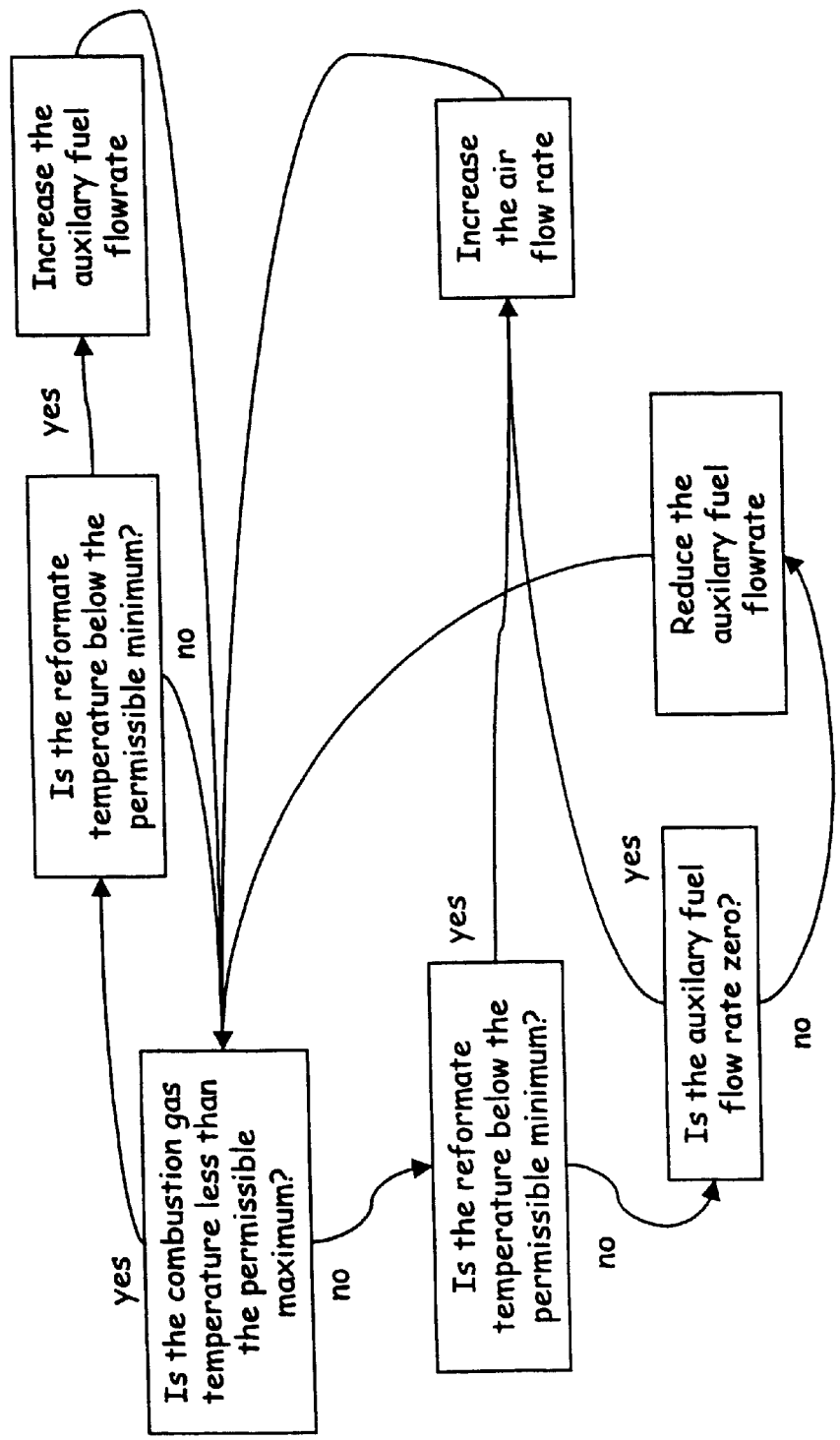
FIG. 6 is a logic diagram for a preferred combustor outlet temperature control apparatus of the present invention.

Referring to FIG. 6, the preferred embodiment of the temperature control scheme for the reactor-combustor system is shown. The control scheme employs a minimum of two temperature sensors shown in FIG. 5, the first temperature sensor 80 in the hotter outlet stream of the catalytic combustor and the second temperature sensor 52 in the outlet stream of the colder, steam reforming side of the steam reformer. The temperatures at these two points are preferably measured at repeated intervals, and their values are compared to target values.

If the combustor outlet temperature measured by the sensor 80 is above the preset value, which is dependent upon the fuel, the steam to carbon ratio, the reactor pressure, and the reactor design, then the temperature of the heated reformate measured by sensor 52 is checked. If this temperature is below the minimum value consistent with proper performance, then the flowrate of air to the combustor must be increased and the cycle repeated. This change in the airflow may be affected by a variation in the compressor or blower speed, or by the application of a throttling valve. The air to fuel stoichiometry will always be fuel lean in the reformer system of the present invention in order to control the peak temperature to a safe level. If the reformate temperature is above the minimum temperature, the flowrate of the auxiliary fuel must be checked. If this flowrate is zero, then the air flowrate must be increased and the cycle restarted. If the flowrate of auxiliary fuel is not zero, then the flowrate should be decreased and the cycle restarted.

If the combustor outlet temperature does not exceed the maximum temperature, then the reformate temperature must be checked. If the reformate temperature is above the minimum value, then all is well and no changes are required. The control system will then continue to cycle until something disturbs the steady-state condition. If, however, the reformate temperature is below the minimum value, the flowrate of auxiliary fuel must be increased and the cycle repeated.

Other control strategies which achieve the twin aims of maintaining a maximum temperature in the combustion product and a minimum temperature in the reformate will be apparent to one skilled in the art. Modifications to the control strategy of FIG. 6 designed to improve the response of the system or to reduce oscillations about the steady state condition may also be envisioned. These alternative and modified control strategies are encompassed within the scope of the present invention.

Figure 7:
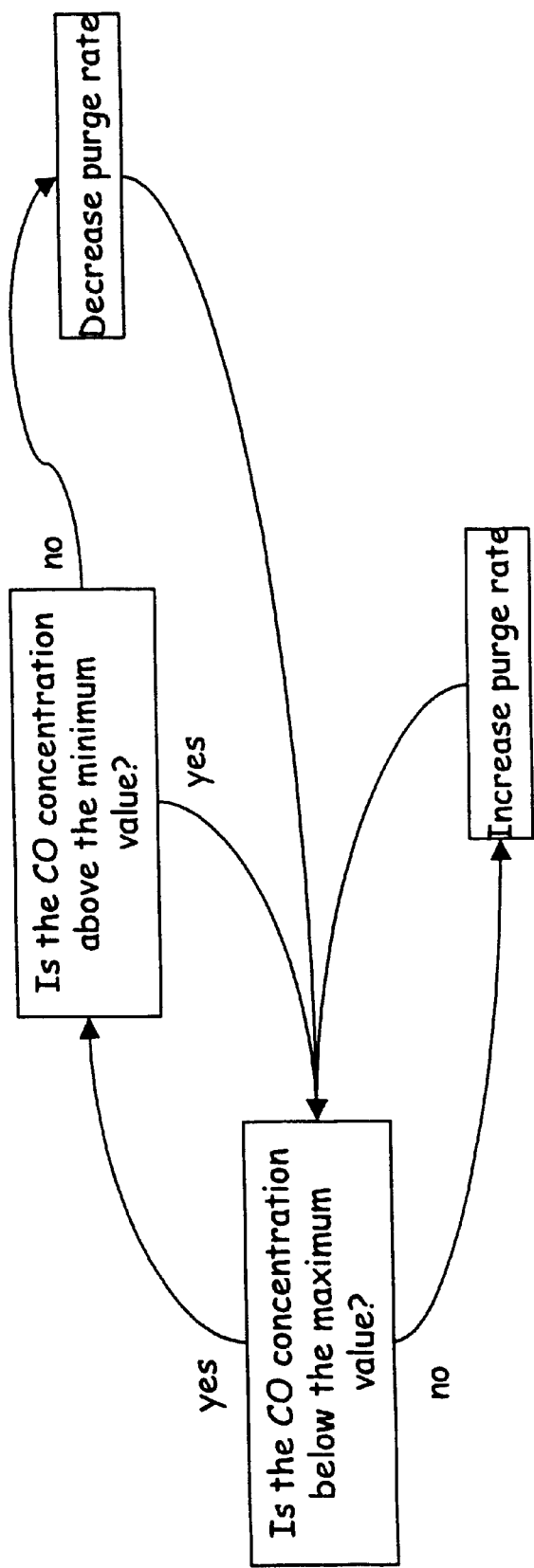
FIG. 7 is a logic diagram for a preferred gas purity control apparatus of the present invention.

FIG. 7 presents a preferred example of a feedback control strategy for the PSA subsystem based upon the signal from a carbon monoxide sensor. If the carbon monoxide sensor detects a concentration above the maximum value, the purge rate for the PSA system is increased and the control cycle is repeated. If the carbon monoxide concentration is below the maximum value, and above the minimum value, then no action is taken and the control cycle repeats. If the value is below the minimum value then the purge rate is decreased and the control cycle repeats. The minimum contaminant concentration is determined by minimum allowable system efficiency, as running at arbitrarily high purge rates will greatly reduce hydrogen recovery and thus system thermodynamic efficiency. As noted previously, the example of carbon monoxide, though particularly suitable for fuel cell applications, is not limiting. Feedback control based upon the exit concentrations of other gases may also be employed, and is within the scope of the present invention.

The improved hydrogen generation system of the present invention has many advantages compared to conventional systems, especially for applications requiring less than one ton per day of hydrogen. Preferably, the present invention is used in a reactor system producing less than 1 ton per day of hydrogen, more preferably less than ⅞ ton per day, and most preferably less than ¾ ton per day.

The improved system of the present invention eliminates partial oxidation of the fuel, sulfur removal (via hydrodesulfurization or other processes), and low temperature water gas shift. These simplifications reduce system cost relative to conventional systems by eliminating components. It also improves safety and durability by reducing the number of interconnections which may develop leaks in service.

The improved system of the present invention is capable of quicker and simpler startup from a cold or idle condition. This is due to several factors, including the reduced mass of the present system due to the elimination of many components as well as the fact that the rugged catalysts employed in the system of the present invention are insensitive to fuel impurities which require bypassing the feed in conventional systems until full operating temperature is attained. The startup is further simplified as the rugged catalysts do not require inert purging during startup. The rugged catalysts of the present invention also do not require special precautions on shutdown such as inert purging. This simplifies the design of the system further, thus reducing cost and improving safety.

The improved system of the present invention preferably operates in a pressure regime where suitable pressurization equipment is commercially-available and very inexpensive. Conventional systems operate either at low pressure in the steam reformer, with subsequent compression of the reformate product at high cost and complexity, or at very high pressures where small-scale compression equipment is not readily available.

The improved system of the present invention preferably employs active control of the reactor peak temperature. This temperature is limited to a value consistent with extended operation of the reformer. In conventional systems, the peak gas temperatures were often above an acceptable service temperature of the reactor structure, and if any upset in the endothermic catalytic reaction took place the structure might be badly overheated.

Figure 8:
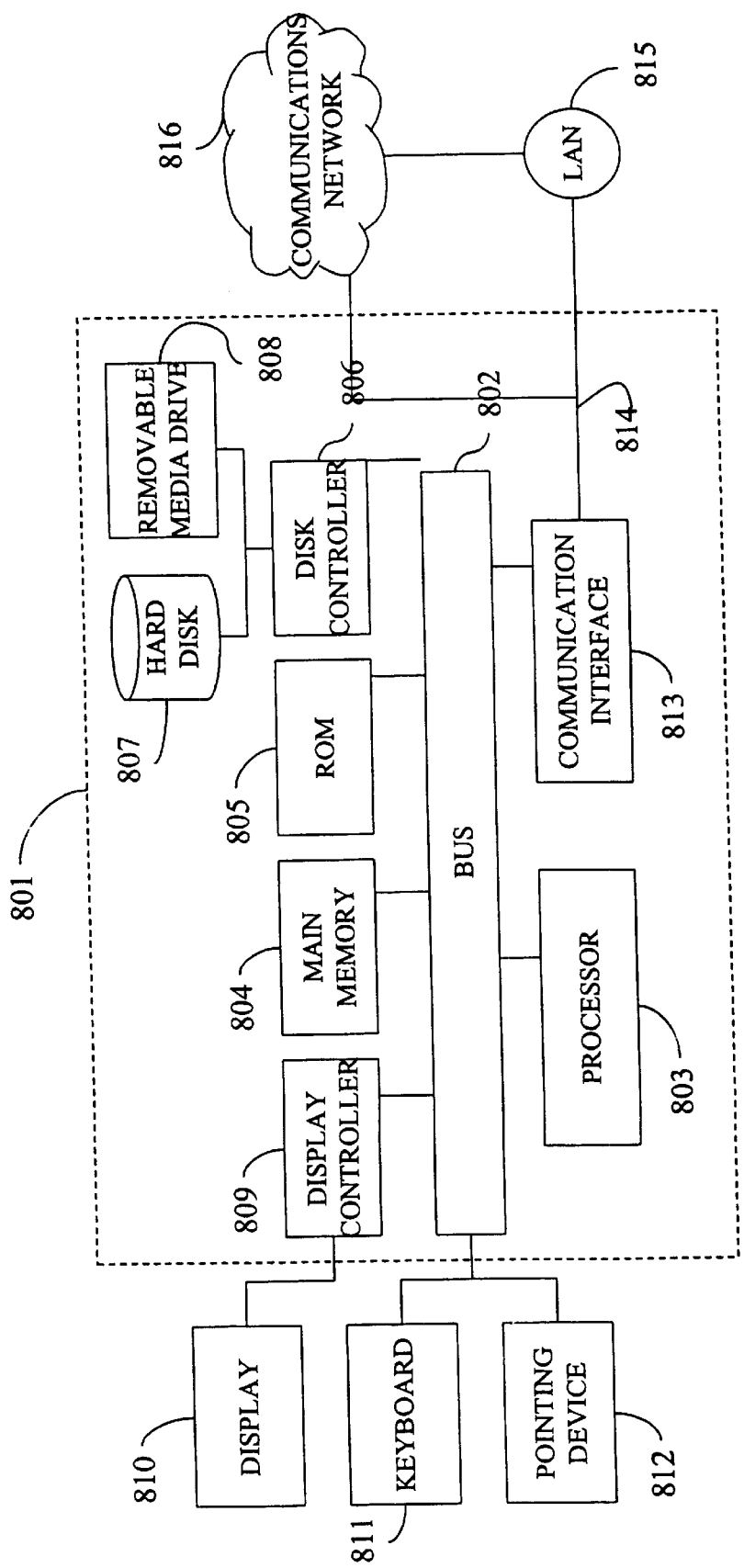
FIG. 8 illustrates a computer system upon which a preferred embodiment of the present invention may be implemented.

Any embodiment of the hydrogen production system of the present invention may be implemented on a computer system. FIG. 8 illustrates a preferred computer system 801 upon which an embodiment of the present invention may be implemented. The computer system 801 includes a bus 802 or other communication mechanism for communicating information, and a processor 803 coupled with the bus 802 for processing the information. The computer system 801 also includes a main memory 804, such as a random access memory (RAM) or other dynamic storage device (e.g., dynamic RAM (DRAM), static RAM (SRAM), and synchronous DRAM (SDRAM)), coupled to the bus 802 for storing information and instructions to be executed by processor 803. In addition, the main memory 804 may be used for storing temporary variables or other intermediate information during the execution of instructions by the processor 803. The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 801 may also include a display controller 809 coupled to the bus 802 to control a display 810, such as a cathode ray tube (CRT), for displaying information to a computer user. The computer system includes input devices, such as a keyboard 811 and a pointing device 812, for interacting with a computer user and providing information to the processor 803. The pointing device 812, for example, may be a mouse, a trackball, or a pointing stick for communicating direction information and command selections to the processor 803 and for controlling cursor movement on the display 810. In addition, a printer may provide printed listings of the data structures/information shown in FIGS. 3 and 4, or any other data stored and/or generated by the computer system 801.

The computer system 801 performs a portion or all of the processing steps of the invention in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 801, for driving a device or devices for implementing the invention, and for enabling the computer system 801 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 803 for execution. A computer readable medium may take many forms, including but not limited to, non-volatile media, volatile media, and transmission media. Non-volatile media includes, for example, optical, magnetic disks, and magneto-optical disks, such as the hard disk 807 or the removable media drive 808. Volatile media includes dynamic memory, such as the main memory 804. Transmission media includes coaxial cables, copper wire and fiber optics, including the wires that make up the bus 802. Transmission media also may also take the form of acoustic or light waves, such as those generated during radio wave and infrared data communications.

Various forms of computer readable media may be involved in carrying out one or more sequences of one or more instructions to processor 803 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 801 may receive the data on the telephone line and use an infrared transmitter to convert the data to an infrared signal. An infrared detector coupled to the bus 802 can receive the data carried in the infrared signal and place the data on the bus 802. The bus 802 carries the data to the main memory 804, from which the processor 803 retrieves and executes the instructions. The instructions received by the main memory 804 may optionally be stored on storage device 807 or 808 either before or after execution by processor 803.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a network interface card to attach to any packet switched LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to a another computer through a local network 815 (e.g., a LAN) or through equipment operated by a service provider, which provides communication services through a communications network 816. In preferred embodiments, the local network 814 and the communications network 816 preferably use electrical, electromagnetic, or optical signals that carry digital data streams. The signals through the various networks and the signals on the network link 814 and through the communication interface 813, which carry the digital data to and from the computer system 801, are exemplary forms of carrier waves transporting the information. The computer system 801 can transmit and receive data, including program code, through the network(s) 815 and 816, the network link 814 and the communication interface 813.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Preferred embodiments of the invention are listed below:

A. A system for the production of hydrogen from hydrocarbon fuel such as natural gas, propane, naphtha, and other hydrocarbons low in sulfur content (<100 ppm sulfur by mass); wherein the product hydrogen is made substantially pure (>99.99%) by separating impurities using a pressure swing adsorption (PSA) system, wherein no pretreatment of the fuel feed to the steam reformer by the removal of sulfur and molecular oxygen is carried out.

B. The hydrogen production system of A wherein the steam reforming catalyst is insensitive to sulfur and molecular oxygen, preferably the catalyst active metal comprises one or more of the following group VIIIB metals singly or in combination; ruthenium, iridium, rhodium, platinum and palladium supported upon a high area ceramic support.

C. The hydrogen production system of A wherein the operation of the system is in a mesobaric regime, between 4 and 18 atmospheres, more preferably the pressure is between 5 atm and 15 atm, most preferably the pressure is between 10 atm and 15 atm.

D. The hydrogen production system of A wherein feedback control is employed for the delivery of fuel and or air to a catalytic combustor in proportion such that the peak temperature of the gases entering the primary steam reformer does not exceed a safe maximum temperature determined by the metallurgy of the steam reformer.

E. The hydrogen production system of A where no low temperature water gas shift reactor is employed, wherein the exit temperature of the high temperature water gas shift reactor employed is preferably above 200° C., more preferably the temperature is greater than 250° C. and less than 400° C., most preferably the temperature is greater than 275° C. and less than 350° C.

F. The hydrogen production system of A wherein feedback control of product carbon monoxide, or other impurity, concentration is employed.

G. The hydrocarbon production system of A wherein the pretreatment includes at least one selected from the group including partial oxidation, hydrodesulfurization, adsorption, and absorption.

I. A hydrogen production method, which includes the catalytic steam reforming and subsequent high temperature water gas shift of low-sulfur (<100 ppm by mass) hydrocarbon fuels to produce hydrogen followed by hydrogen purification with pressure swing adsorption (PSA).

Having now fully described the invention, it will be apparent to one of ordinary skill in the art that many changes and modifications may be made thereto, without departing from the spirit or scope of the invention as set forth herein.

It is therefore to be understood that within the scope of the appended claims, the invention may be practiced otherwise than as specifically described herein.

U.S. Provisional Application No. 60/214,737, filed Jun. 29, 2000, is hereby incorporated by reference in its entirety, the same as if set forth at length.

The entire contents of each of the above-mentioned patents, references and published applications is hereby incorporated by reference, the same as if set forth at length.

What is claimed is:

1. A method for producing hydrogen from a feedstock comprising water and at least one fuel selected from the group consisting of hydrocarbon fuel, natural gas, propane, naphtha, hydrocarbons with <100 ppm sulfur by mass, and mixtures thereof, comprising:

in a reactor, producing hydrogen by steam reforming said fuel; and purifying said hydrogen with a pressure swing adsorption (PSA) system;

wherein prior to said producing, no pretreatment of said fuel to remove at least one impurity selected from the group consisting of sulfur and molecular oxygen and mixtures thereof is carried out;

wherein a molar ratio of water molecules to carbon in said feedstock ranges from 3:1 to 8:1; and wherein said reactor comprises:

a unitary shell assembly having an inlet and an outlet;

a flow path extending within said shell assembly from said inlet to said outlet, said flow path having a steam reformer section with a first catalyst and a water gas shift reactor section with a second catalyst, said steam reformer section being located upstream of said water gas shift reactor section;

a heating section within said shell assembly and configured to heat said steam reformer section; and a cooling section within said shell assembly and configured to cool said water gas shift reactor section;

wherein said first catalyst comprises a steam reforming catalyst; and wherein said second catalyst comprises a water-gas shift catalyst.

2. The method of claim 1, wherein said steam reforming catalyst is insensitive to sulfur and molecular oxygen.

3. The method of claim 2, wherein said steam reforming catalyst comprises a catalytically active metal selected from the group consisting of group VIIIB metals, ruthenium, iridium, rhodium, platinum, palladium and mixtures thereof supported upon a ceramic support.

4. The method of claim 1, which is carried out at a pressure of between 4 and 18 atmospheres.

5. The method of claim 1, further comprising a feedback control loop for delivering air or said fuel or both to said steam reforming and for controlling a temperature of said fuel or said air or both.

6. The method of claim 1, which does not comprise a low temperature water gas shift reaction.

7. The method of claim 6, further comprising, prior to said purifying and subsequent to said steam reforming, a high temperature water gas shift reaction, and wherein an exit temperature of a product exiting said high temperature water gas shift reaction is above 200° C.

8. The method of claim 1, wherein said reforming produces carbon monoxide or at least one impurity or both, and wherein said method further comprises a feedback control loop for controlling a concentration of said carbon monoxide or said impurity or both.

9. The method of claim 1, wherein said pretreatment is at least one selected from the group consisting of partial oxidation, hydrodesulfurization, adsorption, absorption, and combinations thereof.

10. The method of claim 1, further comprising, prior to said purifying and subsequent to said steam reforming, a high temperature water gas shift reaction, wherein an exit temperature of a product exiting said high temperature water gas shift reaction is greater than 200° C.

11. The method of claim 1, further comprising, prior to said purifying and subsequent to said steam reforming, a high temperature water gas shift reaction, and wherein an exit temperature of a product exiting said high temperature water gas shift reaction is greater than 250° C.

12. The method of claim 1, further comprising, prior to said purifying and subsequent to said steam reforming, a high temperature water gas shift reaction, and wherein an exit temperature of a product exiting said high temperature water gas shift reaction is greater than 250° C. and less than 400° C.

13. The method of claim 1, further comprising, prior to said purifying and subsequent to said steam reforming, a high temperature water gas shift reaction, and wherein an exit temperature of a product exiting said high temperature water gas shift reaction is greater than 275° C.

14. The method of claim 1, further comprising, prior to said purifying and subsequent to said steam reforming, a high temperature water gas shift reaction, and wherein an exit temperature of a product exiting said high temperature water gas shift reaction is greater than 350° C.

15. The method of claim 1, which is carried out at a pressure of between 5 and 15 atmospheres.

16. The method of claim 1, which is carried out at a pressure of between 10 and 15 atmospheres.

17. The method of claim 1, wherein said hydrogen is purified to a purity of >99.99%.

18. The method of claim 1, which produces less than 1 ton of said hydrogen per day.

19. The method of claim 1, which produces less than ⅞ ton of said hydrogen per day.

20. The method of claim 1, which produces less than ¾ ton of said hydrogen per day.

* * * * *